United States Patent [19]
Lane

[11] Patent Number: 5,381,450
[45] Date of Patent: Jan. 10, 1995

[54] TECHNIQUE FOR AUTOMATICALLY DETECTING THE CONSTELLATION SIZE OF A QUADRATURE AMPLITUDE MODULATED (QAM) SIGNAL

[75] Inventor: Frank A. Lane, Medford Lakes, N.J.
[73] Assignee: Hitachi America, Ltd., Tarrytown, N.Y.
[21] Appl. No.: 109,651
[22] Filed: Aug. 20, 1993
[51] Int. Cl.6 .................................. H04L 27/06
[52] U.S. Cl. .................................. 375/94; 329/304
[58] Field of Search .................... 375/39, 10, 94, 75; 329/304; 371/43

[56] References Cited
U.S. PATENT DOCUMENTS
4,918,708  4/1990  Pottinger et al. ............ 375/10

Primary Examiner—Stephen Chin
Assistant Examiner—Tesfaldet Bocure
Attorney, Agent, or Firm—Peter L. Michaelson

[57] ABSTRACT

A technique for determining the constellation size of a QAM signal received by a QAM receiver. In general, the implementation of my technique has, as an input signal, a QAM signal having one of a plurality of constellation sizes and determines of constellation size, e.g., 4, 16, 32-ary, by analyzing the probability density function (pdf) of the QAM signal over a pre-established time period. To properly analyze the QAM signal, the signal is-first squared and then normalized to a preset value, e.g., 2.0. As such, the signal power in any of the various constellations is normalized to a fixed level. By generating a histogram of the squared and normalized QAM signal, the technique determines the number of levels of modulation contained in the QAM signal. Each constellation size has a unique number of modulation levels and thus forms unique histogram. From the histogram, a particular constellation size can be determined. Thus, by generating a histogram, the technique determines the constellation size of a QAM signal without requiring a priori carrier lock before accomplishing such a determination.

24 Claims, 5 Drawing Sheets

FIG. 1

X — 16 QAM Constellation Points
O — 32 QAM Constellation Points

TECHNIQUE FOR AUTOMATICALLY DETECTING THE CONSTELLATION SIZE OF A QUADRATURE AMPLITUDE MODULATED (QAM) SIGNAL

BACKGROUND OF THE DISCLOSURE

1. Field of the Invention

The invention relates to communications receivers, and particularly, to apparatus for use in such a receiver for automatically detecting a constellation size of a received quadrature amplitude modulated (QAM) signal.

2. Description of the Prior Art

Various communications systems utilize quadrature amplitude modulation (QAM) for transmission of relatively high data rate information within a limited transmission bandwidth. Typically, QAM communications systems use a fixed symbol constellation for all transmissions, e.g., sixteen positions or points within a constellation. Conventional QAM receivers are capable of receiving transmissions of only a single symbol constellation size.

However, recently, sophisticated QAM communications systems are capable of transmitting variable symbol rate transmissions using two or more symbol constellations. For example, such a QAM system could vary its symbol rate between a 32-ary constellation and a 16-ary constellation depending upon the presence of atmospheric noise. Specifically, during periods of low atmospheric noise, such a QAM system can use 32-ary transmissions. When atmospheric noise, as measured at the transmitter, has increased above a pre-established noise threshold, the constellation size is then decreased to a 16-ary constellation. During periods of extremely low noise, the constellation size could be increased to transmissions of 32-ary, 64-ary or even 128-ary constellations. Alternatively, a QAM system may be required to transmit one constellation size over-the-air and a second constellation size over a cable broadcast system. As such, a "cable ready" receiver must be able to receive both constellation sizes.

One such variable constellation size communication system is being considered by the Federal Communications Commission (FCC) as a standard transmission format for high definition television (HDTV). The particular standard would permit HDTV broadcasters to use either 16-ary or 32-ary QAM symbol constellations for broadcasting HDTV signals. As such, a given HDTV receiver may receive a 16-ary transmission when viewing one particular channel and a 32-ary transmission when viewing a second channel. Additionally, a given HDTV broadcaster may change its transmitted symbol constellation from 16- to 32-ary, or vice versa, whenever noise conditions permit the higher (lower) rate of transmission to a majority of the broadcast audience. Thus, an HDTV receiver must be capable of automatically determining whether a received broadcast is a 16- or 32-ary transmission. Such a determination must be accomplished whenever a user changes channels or the broadcaster changes transmission rates. Additionally, the constellation size determination must be accomplished relatively quickly such that a user will not notice the change in the constellation size of the broadcast, i.e., notice a loss of signal reception while the receiver adjusts to a new constellation size.

Furthermore, HDTV cable broadcasts may utilize 64-ary transmissions. As such, a "cable ready" HDTV receiver must be capable of receiving 16, 32 and 64-ary transmissions.

Typically, a receiver of variable constellation size transmissions contains demodulator circuits capable of demodulating each expected size of symbol constellation. In particular, a receiver capable of receiving both 16- and 32-ary symbol constellations would contain both a 16-ary demodulator and a 32-ary demodulator. In this manner, both symbol constellations are demodulated simultaneously even though only one constellation is transmitted. Thus, one demodulator produces no signal, while the other demodulator demodulates the received symbols and generates information therefrom. Though such a receiver accomplishes reception of either symbol constellation, such redundant demodulators are complex and costly to manufacture.

Using an alternative technique to determine constellation size, an HDTV receiver contains a single demodulator having two modes of operation, i.e., one for each expected symbol constellation size. As such, the demodulator attempts to demodulate one of the constellation sizes, e.g., a 16-ary symbol constellation, using one of its two modes of operation. Meanwhile, circuitry within the receiver monitors an error rate from a Reed-Solomon decoder within the demodulator. If the error rate exceeds a pre-defined threshold, the receiver assumes that the demodulator is set to demodulate the incorrect symbol constellation size. In response, the receiver switches the demodulator to a second mode of operation, e.g., a 32-ary symbol constellation mode, capable of demodulating a second symbol constellation size, e.g., 32-ary. Simply stated, the error rate at the output of the Reed-Solomon decoder indicates which constellation is presently being demodulated. However, for a Reed-Solomon decoder to operate properly, a carrier recovery circuit must be locked onto a carrier for the transmission. Otherwise, the Reed-Solomon decoder produces a high error rate for both modes of operation. As such, this form of receiver first requires that a carrier lock be achieved before determining the constellation size. Detrimentally, this two-step process is relatively slow to determine the constellation size of the received broadcast. Consequently, a large amount of information can be lost while the receiver is achieving carrier lock and then determining the constellation size before beginning to demodulate the broadcast.

Therefore, a need exists in the art for apparatus, particularly though not exclusively for use in a HDTV QAM receiver, for automatically detecting the constellation size of a QAM transmission without requiring the QAM demodulator to, a priori, acquire carrier lock. Additionally, to minimize any noticeable signal impact to a viewer, this detection should be performed relatively quickly.

SUMMARY OF THE INVENTION

My invention advantageously overcomes the disadvantages heretofore associated with receivers that require a priori carrier lock before determining constellation size of a received QAM signal. Specifically, through my invention the constellation size of a QAM signal, received by a QAM receiver, is directly determined without advantageously requiring carrier lock or redundant demodulators.

In general, my invention determines the constellation size, e.g., 4, 16, 32-ary, of a particular received QAM signal by analyzing the probability density function (pdf) of that signal. To properly analyze this signal, its magnitude is first squared and then normalized to a preset value, e.g., 2.0. As such, the signal power in any of the various constellations is normalized to a fixed level. In addition, squaring the magnitude of the QAM signal removes the requirement to achieve carrier lock prior to attempting to determine the constellation size. Then, through generating a histogram of the squared and normalized QAM signal, the number of levels of modulation contained in the QAM signal is determined. Each constellation size has a unique number of modulation levels and thus a unique histogram. For example, a 4-ary constellation contains one modulation level, 16-ary contains three modulation levels and 32-ary contains five modulation levels. Each modulation level produces a histogram. Thus, by generating a histogram, my invention determines the constellation size of a QAM signal without requiring a priori carrier lock before accomplishing such a determination.

Specifically, in accordance with my inventive teachings, a number of histogram bins is established for each different QAM constellation in a QAM signal that is expected to be received. Each bin has a pre-defined width and is located at an expected peak in a pdf of a corresponding one of the QAM signals. The peaks are located at various normalized power levels of the expected QAM signal; the bin widths are defined by a range of power levels around each peak location. The number of bins and their specific locations depend upon the number of different constellation sizes and the size of those constellations that are expected to be received. In operation, a counter associated with each bin counts (accumulates) the number of symbols that fall therein. The symbols are counted over a fixed time period. At the end of the period, my technique compares, to one another, the number of symbols counted by each counter. The result of the comparison indicates the number of modulation levels for the QAM signal being received which, in turn, indicates the constellation size of that QAM signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the Figures.

DETAILED DESCRIPTION

After considering the following description, those skilled in the art will clearly realize that the teachings of my invention can be readily utilized in various communications receivers that receive quadrature amplitude modulated (QAM) signals of various constellation sizes. In particular, my invention is used to determine the constellation size of a QAM signal without requiring carrier lock prior to making such a determination.

In general, my inventive apparatus first generates a square of the magnitude of a received QAM signal, i.e., a magnitude squared QAM signal. The magnitude squared QAM signal is then accumulated over a pre-defined time period to produce a probability density function (pdf) for the QAM signal. Each QAM signal constellation size has a unique pdf, e.g., a 32-ary QAM signal produces a pdf having five peaks (maximums), a 16-ary QAM signal produces a pdf having three peaks. Each peak corresponds to a concentric ring of symbol amplitudes, i.e., a modulation level, within the constellation. The resulting pdf of the received QAM signal is monitored, with the constellation size being determined therefrom. The constellation size determination is then passed to a demodulator which in turn, takes whatever action is necessary to demodulate a QAM signal having that particular constellation size.

The following detailed discussion of my invention illustratively focuses upon using my invention to determine whether a QAM signal has a 16- or 32-ary constellation. However, those skilled in the art will realize that the invention can be used to determine whether a QAM signal is any one of a plurality of M-ary constellation sizes.

Figure 1:
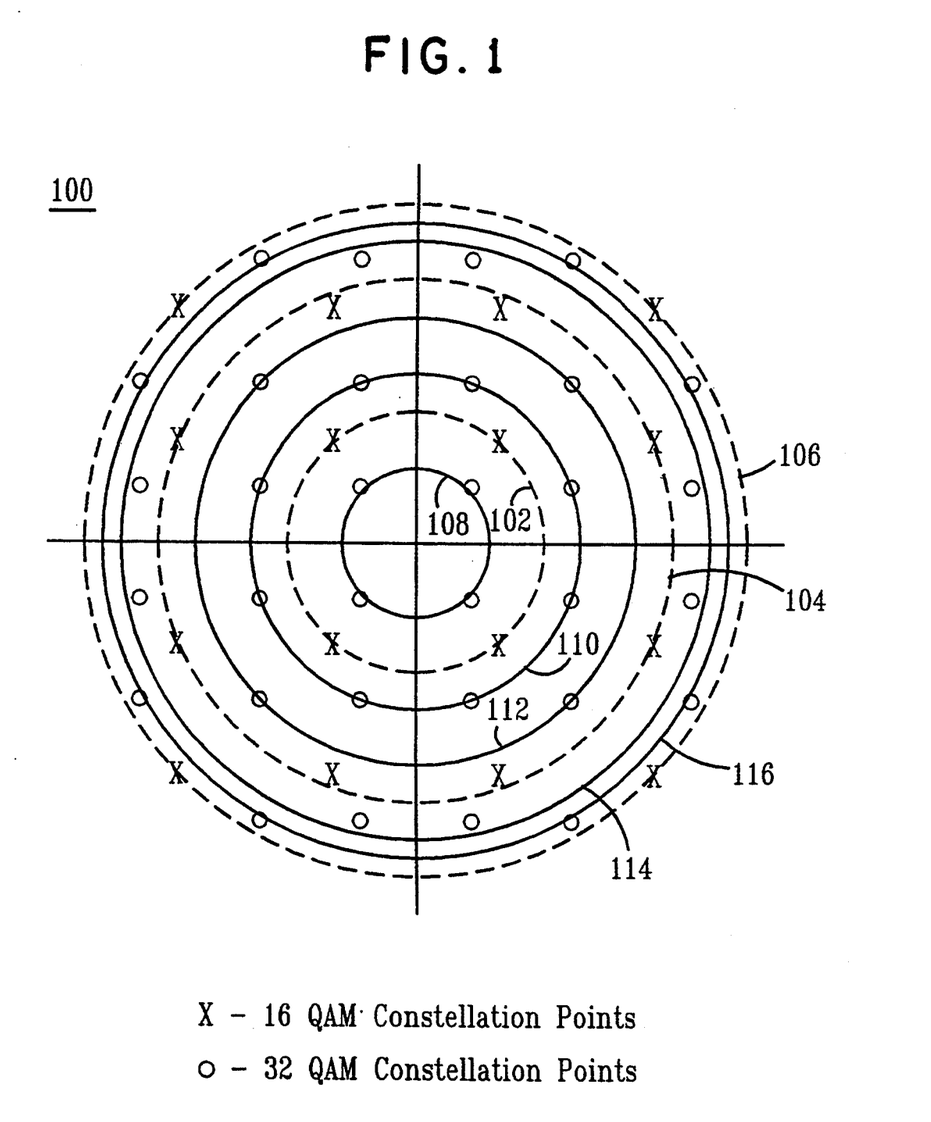
FIG. 1 graphically shows 16- and 32-ary quadrature amplitude modulation (QAM) signal constellations having equal power levels.

FIG. 1 depicts graph 100 of a 16-ary QAM signal constellation (each symbol is shown as an X) superimposed over a 32-ary QAM signal constellation (each symbol is shown as an O), where each constellation contains equal power. In other words, the constellations have been equalized to have equivalent power content. For each constellation, each symbol within that constellation falls upon one of a number of pre-defined concentric rings that represent symbol magnitude. Specifically, the 16-ary constellation has each of its symbols fall on rings 102, 104 and 106 (all shown as dashed lines). In contrast, the 32-ary constellation has the magnitude of its symbols aligned with rings 108, 110, 112, 114 and 116 (all shown as solid lines). Each ring represents a modulation level within the QAM signal.

Figure 2:
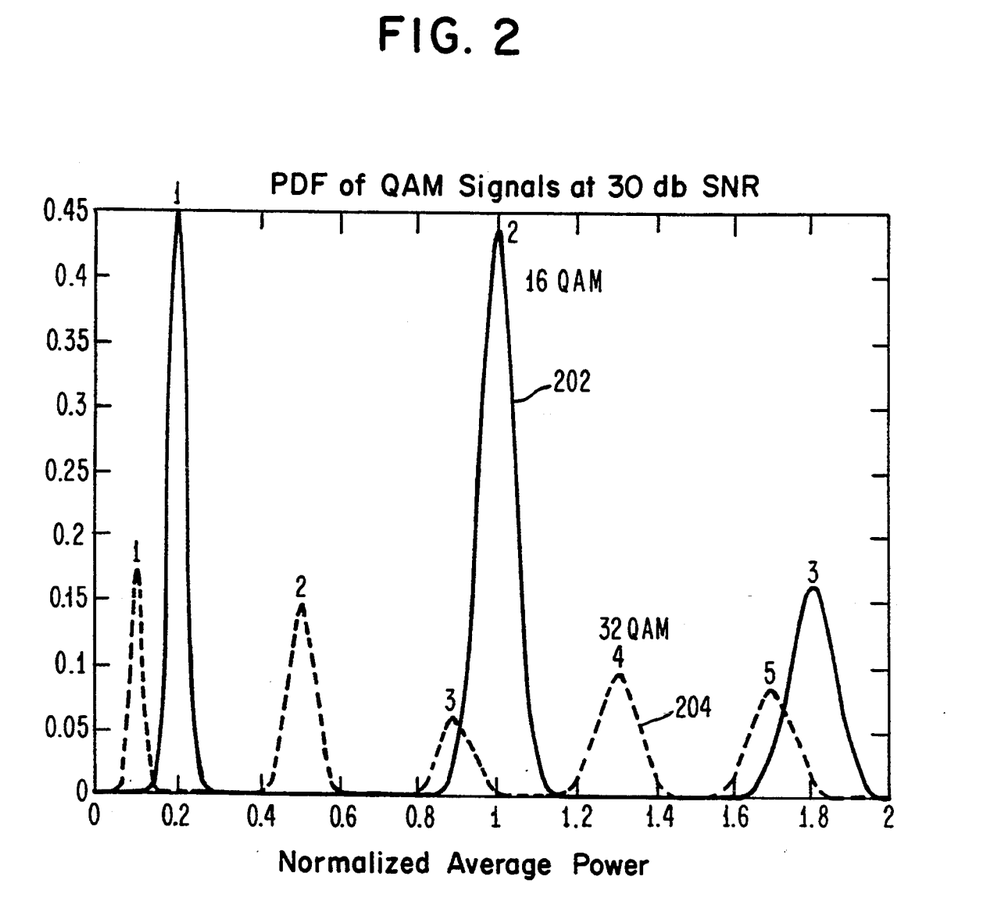
FIG. 2 depicts a graph of the probability density functions (pdfs) of magnitude squared 16- and 32-ary QAM signals.

FIG. 2 depicts graph 200 of probability density functions (pdfs) for magnitude squared 16- and 32-ary QAM signal constellations when the constellations, as shown in FIG. 1, are scaled to contain equal power. The pdf of the 16-ary constellation is shown in FIG. 2 using solid line 202 and the pdf of the 32-ary constellation is shown using dashed line 204. The pdfs are produced by first squaring the magnitude of a QAM signal having a 30 dB signal to noise ratio (SNR) and then accumulating the magnitude squared signal over a pre-determined period of time. Consequently, a peak (maximum) appears in graph 200 wherever a ring of symbols appeared in FIG. 1. The locations of the peaks are unique for each constellation size. Thus, by analyzing the pdfs to determine the locations of peaks therein, the constellation size of a QAM signal can be uniquely determined.

In general, analyzing the QAM signal constellation in accordance with my inventive technique requires establishing a plurality of histogram bins. The specific number of bins depends on particular design parameters that are discussed in detail below. Each bin has a width defined by a range of normalized power that is centered at a normalized power level represented by each peak in graph 200. A counter associated with each of the histogram bins counts the number of symbols that occur within each bin over a pre-established time period. The count in each bin at the end of the period corresponds to the relative size of the pdf peaks and, therefore, uniquely defines the constellation size.

Table 1 shows a correlation between the various amplitude peaks for each QAM signal, the location of these peaks measured in normalized power, and the expected amplitude value of each peak.

TABLE 1

| QAM pdf peaks of normalized constellations | | |
|---|---|---|
| | LOCATION | AMPLITUDE |
| 32 QAM PEAKS | | |
| 1 | .1 | ⅛ |
| 2 | .5 | ¼ |
| 3 | .9 | ⅛ |
| 4 | 1.3 | ¼ |
| 5 | 1.7 | ¼ |
| 16 QAM PEAKS | | |
| 1 | .2 | ¼ |
| 2 | 1.0 | ½ |
| 3 | 1.8 | ¼ |

If a large number of symbols is histogrammed into bins surrounding each of the pdf peaks, the expected number of symbols to be counted in each bin would be the total number of symbols (N) expected during a given time period multiplied by the expected pdf amplitude of the peak associated with a particular bin. However, in the presence of noise, the histogram is degraded. Additive Guassian noise alters the pdf of the QAM signal by spreading and shifting the peaks. For relatively high signal-to-noise ratios (SNR), the pdf peaks will stand out above the noise, but at low SNR, the peaks smear together and become indistinguishable from one another. Typically, the higher magnitude peaks, e.g., peaks 4 and 5 in 32-ary QAM, are most severely affected by additive noise and become indistinguishable before the lower magnitude peaks, e.g., peaks 1, 2 and 3 in 32-ary QAM, become indistinguishable. These lower magnitude peaks all occur below a normalized power of 1.0. To optimize performance when selecting between 16- or 32-ary constellations, the peaks above the normalized power of 1.0 are not examined by my inventive technique.

Additionally, for the illustrative use of my technique to differentiate 16- from 32-ary QAM, counting the number of symbols that occur in each bin would require eight bins and a rather significant amount of circuitry to compare the counts of each counter associated with each bin to determine the constellation size. The circuitry required to differentiate between 16- and 32-ary QAM signals can be significantly reduced by using only two bins. Specifically, a bin (bin 2) is located at a normalized power level of 0.5, e.g., peak 2 of the 32-ary QAM signal pdf, and a bin (bin 3) is located at a normalized power level of 1.0, e.g., approximately at peak 3 of the 32-ary QAM signal pdf and at peak 2 of the 16-ary QAM signal pdf. As such, over a given time period, a 32-ary QAM signal constellation generates a higher count in bin 2 than in bin 3, i.e., the maximum value of the pdf at peak 2 is larger than at peak 3. In contrast, the 16-ary QAM constellation generates a higher count in bin 3 than in bin 2. Consequently, the count in these two bins over a pre-established period uniquely defines the QAM signal constellation present. The error rate for such a determination method depends upon the width of the bins and the length of the period over which the count is taken. To optimize the bin widths and accumulation time, a statistical analysis of the interaction of these parameters is necessary.

Figure 3:
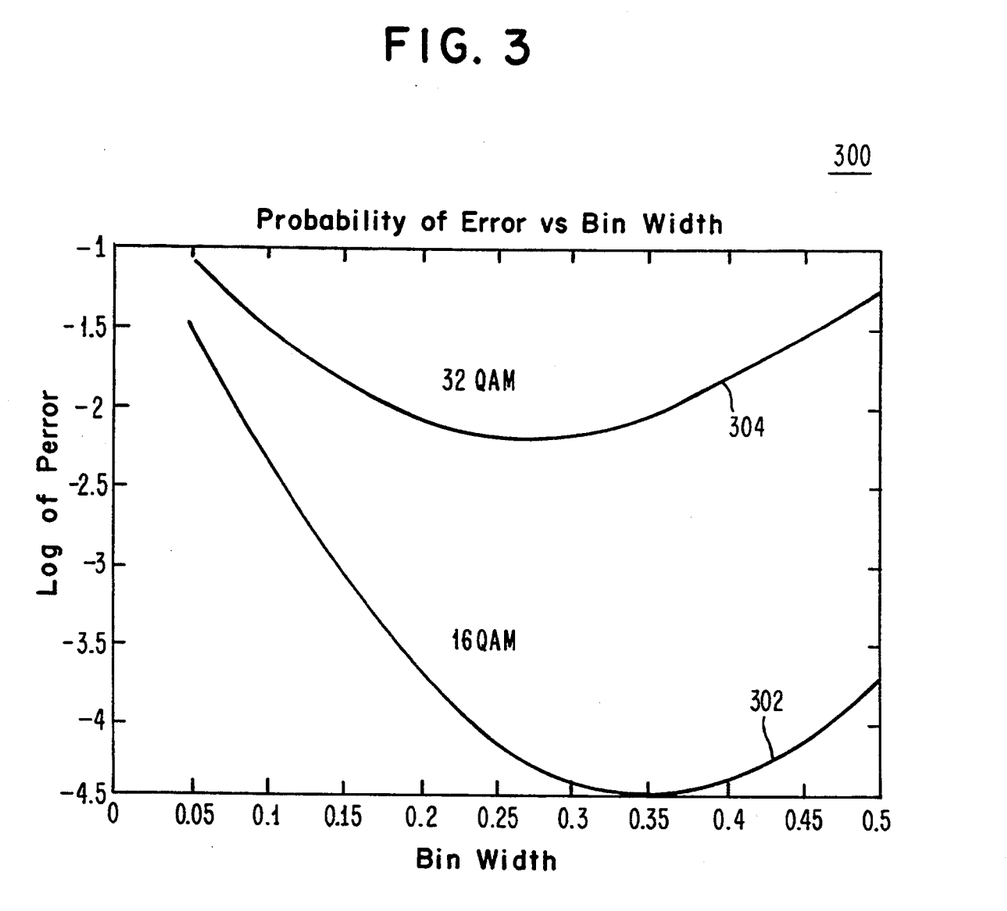
FIG. 3 depicts a graph of the probability of error versus bin width for both 16- and 32-ary QAM signals.

FIG. 3 depicts graph 300 of probability of error in detecting a symbol versus bin width for both 16- and 32-ary QAM signals. To derive graph 300, the bins can be thought of as random variables each having a binomial distribution. The probability of a hit (symbol) falling within a given bin is computed by integrating the magnitude squared symbol plus noise pdf (FIG. 2) over the power range (width) of the bin. The number of symbols integrated is the number of trials in the binomial distribution. From the number of hits in each bin, a random variable X is determined. Specifically, X is a difference between a number ($N_2$) of hits in bin 2 and a number ($N_3$) of hits in bin 3. Consequently, the overall probability of error for my technique is represented by equation (1), as follows:

$$P_{error} = P(X<0 | [32QAM]) + P(X>0 | 16QAM) \qquad (1)$$

where:

X is a difference between a number ($N_2$) of hits in bin 2 and a number ($N_3$) of hits in bin 3.

To evaluate the probability density of X, certain assumptions and approximations must be made about $N_2$ and $N_3$. Since the number of symbols examined is assumed to be very large, e.g., 10,000 or more, and the probability of a hit in a given bin is relatively small, then $N_2$ and $N_3$ can each be approximated by a Poisson distribution. Also, for numerical simplicity, it is assumed that $N_2$ and $N_3$ are independent variables, which, with respect to QAM modulated signals, is not strictly true. However, when the number of symbols is relatively large and the SNR is relatively high, the accumulation in each bin has little effect upon the accumulation in another bin. Under these assumptions and approximations, the pdf of X is a discrete convolution of two Poisson distributions representing $N_2$ and $N_3$ and, thus, can be numerically evaluated.

The defining parameter for each of the Poisson distributions is an expected value of the number of hits in each bin. The value of this parameter is the probability of one hit in a bin (p) times the number of symbols examined (N). Thus, the probability of error for detecting a symbol correctly is determined by the bin width (which determines p) and the number of symbols accumulated (integrated). Each of these parameters can be graphed separately against the probability of error.

In particular, FIG. 3 depicts graph 300 of the probability of error for both a 16- and a 32-ary QAM signals versus bin width for a fixed number of accumulated symbols. Curve 302 was formed using a 16-ary QAM signal having a 10 dB SNR and curve 304 was formed using a 32-ary QAM signal having a 13 dB SNR. The probabilities were calculated using a fixed accumulation (N) of 10,000 symbols. The graph shows the optimal bin width for minimizing the probability of error for both 16- and 32-ary QAM is between 0.25 and 0.3 of the normalized power.

Figure 4:
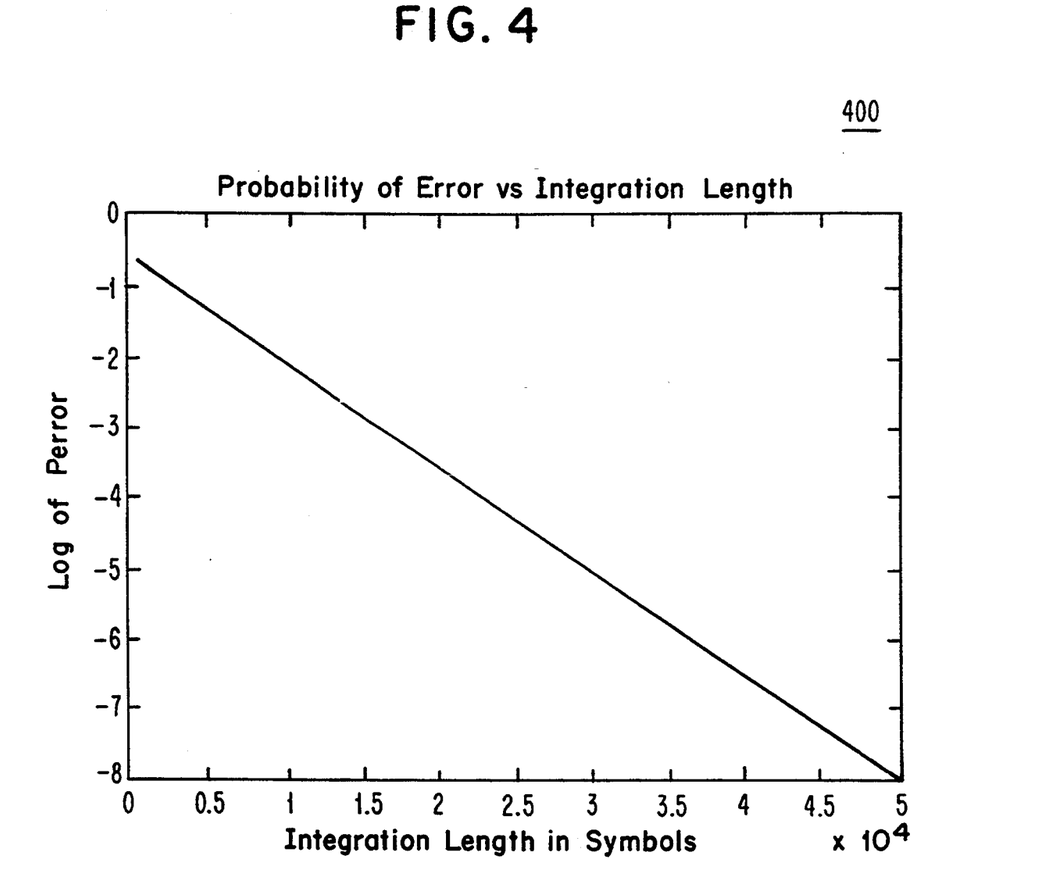
FIG. 4 depicts a graph of the probability of error versus integration length for either 16- or 32-ary QAM signals.

FIG. 4 depicts graph 400 of the probability of error for either a 16- or 32-ary QAM signal versus the integration time measured in number of symbols (N) for a fixed bin width. As would be expected, this graph shows that the probability of error decreases linearly as the integration time is lengthened. However, in practice, it desirable to minimize the integration time, i.e., minimize the signal acquisition time of the receiver in which my technique is used. Therefore, the integration time is selected for a maximum acceptable probability of error for a particular application of my technique.

Figure 5:
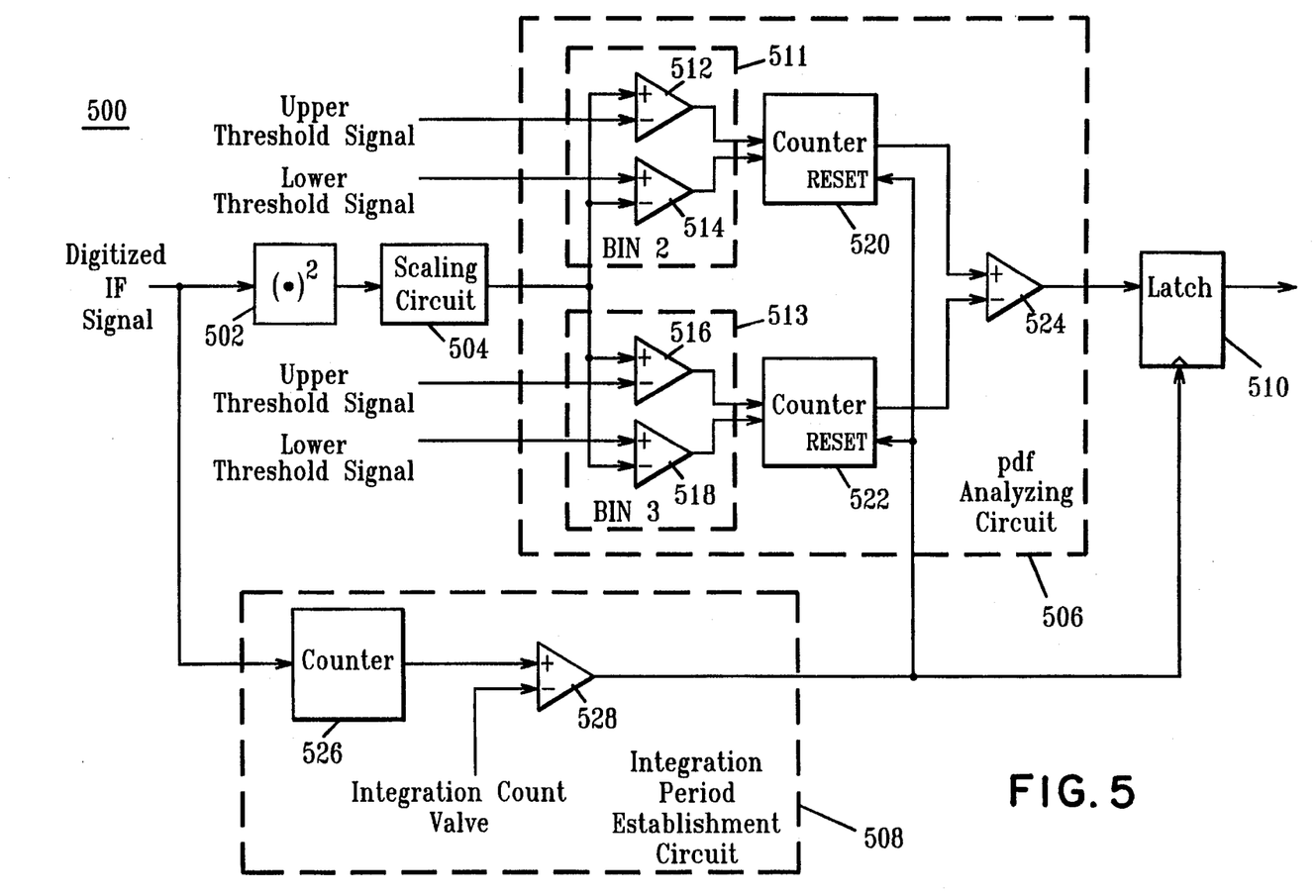
FIG. 5 depicts a block diagram of my inventive modulation level detector circuit 500.

FIG. 5 depicts a block diagram of circuit 500 which implements my inventive technique for determining the size of a QAM signal constellation. In general, an input to this circuit is a digitized intermediate frequency (IF) signal produced by an analog-to-digital (A/D) converter within the receiver. Circuit 500 evaluates the digitized IF signal to determine the QAM signal constellation size from which the digitized IF signal was derived.

Specifically, circuit 500 contains squaring circuit 502, scaling circuit 504, pdf analyzing circuit 506, integration period establishment circuit 508 and latch 510. Squaring circuit 502 squares the magnitude of the QAM signal. Illustratively, such a squaring operation is accomplished by separating the in-phase (I) and quadrature-phase (Q) components of the QAM signal, squaring each independently, then summing the squared I and Q components to produce a magnitude squared signal. Squaring the magnitude of the QAM signal removes any variations of the symbol constellation caused by rotation of the constellation. Such rotation is typically caused by a lack of carrier lock by the receiver in which circuit 500 is used. Consequently, my inventive circuit does not require carrier lock prior to accomplishing the constellation size determination.

The squaring circuit is connected to scaling circuit 504. The scaling circuit scales the digitized IF signal to within a range 0 to 2, i.e., the circuit normalizes the power of the digitized IF signal. Those skilled in the art will recognize that scaling circuit 504 and squaring circuit 502 can be interchanged without detrimentally effecting the operation of my invention. In fact, scaling circuit 504 can be an automatic gain control circuit positioned after the IF signal A/D converter or elsewhere in the receiver.

The scaling circuit is connected to pdf analyzing circuit 506. In general, the pdf analyzing circuit establishes a number of bins in which symbols of the QAM signals are accumulated. By analyzing the accumulated symbols over a pre-defined period, the constellation size of the QAM signals can be uniquely determined. Specifically, the pdf analyzing circuits contain two bins; one bin (bin 2) is centered at a scaled, normalized power level of 0.5, i.e., at peak 2 of the pdf of the 32-ary QAM signal (shown in FIG. 2) and another bin (bin 3) is centered at a scaled, normalized power level of 1.0, i.e., approximately at peak 3 of the pdf of the 32-ary QAM signal (shown in FIG. 2). Using counters 520 and 522, the pdf analyzing circuit counts a number of symbols that occur in each bin over a period of time established by integration period establishment circuit 508. During the period, the pdf analyzing circuit generates an output that represents which bin presently has a larger count. At the end of the integration period, the integration period establishment circuit resets the counters in the pdf analyzing circuit and, simultaneously, latches the output of that circuit. The latched signal represents the constellation size, i.e., whether the constellation is 16- or 32-ary.

More specifically, histogram bin circuit 506 contains comparators 512, 514, 516 and 518 for establishing histogram bins 511 and 513, counters 520 and 522 for counting the symbols in each bin and comparator 524 for determining which counter presently has the largest count.

Comparators 512 and 514 form first histogram bin 511. The output signal of scaling circuit 504 connects to the positive input terminal of comparator 512 and to the negative input terminal of comparator 514. An upper threshold signal connects to the negative terminal of comparator 512 and a lower threshold signal connects to the positive input terminal of comparator 514. Additionally, counter 520 is connected to the outputs of both comparators 512 and 514. The counter is incremented whenever the scaling circuit output signal is both larger than the lower threshold signal and smaller than the upper threshold signal. In this manner, the comparators and their respective threshold levels define a window or bin width. The specific size of the bin width is optimally, as discussed above, 0.25 to 0.3 of normalized power. For illustrative purposes, the bin width is set to a normalized power of 0.25. Thus, the first bin has a lower threshold signal level of 0.375 and an upper threshold signal level of 0.625 measured in normalized power.

Similarly, second bin 513 is established using comparators 516 and 518 in conjunction with upper and lower threshold signals. Using these threshold signals, the bin width of the second bin is also set to a normalized power of 0.25. Specifically, the lower threshold is 0.875 and the upper threshold is 1.125. Consequently, counter 522 is incremented whenever a soft decision signal is within this bin width.

Each counter 520 and 522 has an output that indicates the present count of that counter. The output from counter 520 is connected to the positive input terminal of comparator 524; the output of counter 522 is connected to the negative input terminal of comparator 524. As such, comparator 524 produces an output signal that indicates which counter has the presently larger count. For example, if counter 520 has a larger count than counter 522, the output of comparator 524 is a high level signal. In contrast, if the output of counter 522 is larger than the count of counter 520, the output of comparator 524 is a low level signal.

Integration period establishment circuit 508 contains counter 526 and comparator 528. Counter 526 counts each and every symbol that is represented in the soft decision signal. A period duration is established by the integration count value. The integration count value is connected to the negative input of comparator 528. The output of counter 526 connects to the positive input of comparator 528. Typically, the integration count value is a relatively large number, e.g., 50,000. When the output of counter 526 exceeds the integration count value, the output of the comparator changes states. The output signal of comparator 528 is connected to the reset terminals of counters 520, 522 and 526 (the reset terminal of counter 526 is not specifically shown) as well as to a clock (latch) terminal of latch 510. Upon the occurrence of the rising edge of the output signal of comparator 528 changing states, all of the counters are reset to zero and the output signal of comparator 524 is latched. Once latched, the output signal of latch 510 is the level of the output signal of comparator 524 that was present at the end of the integration period. If counter 520 has a larger count than counter 522 at the end of the integration period, the latched signal will indicate that the soft decision signal was derived from a 32-ary QAM signal. Alternatively, if counter 522 has a larger count than counter 520 at the end of the integration period, the latched signal will indicate that the soft decision signal was derived from a 16-ary QAM signal.

Consequently, the latched signal represents the QAM signal constellation size presently being received by the receiver in which circuit 500 is incorporated.

In operation, circuit 500 achieves superb acquisition and error results. For example, when the bin width of both bins is set to 0.25 in normalized power and the integration time is set to 50,000 symbols, the circuit has a probability of error of $10^{-8}$ for a 32-ary signal at 13 dB SNR. This error rate is equivalent to one error per two days of continuous operation of an HDTV receiver. Furthermore, the error rate for a 16-ary QAM signal is $10^{-10}$ at 10 dB SNR. Using a 50,000 symbol integration period and a SNR of 10 dB, the circuit generally determines the constellation size within 0.01 seconds.

The illustrative 16- and 32-ary constellation size detection apparatus (16/32 QAM apparatus) discussed above can be extended to determine the size of other QAM signal constellations. In fact, as broadly described below, my inventive technique can be utilized to determine the size of one constellation out of M possible constellation sizes, where M is greater than 2.

In general, a particular design of an apparatus for determining constellation size directly depends upon the constellations to be discriminated amongst. However, no matter how many or what size constellations are expected as received QAM signals, the first step in designing such apparatus is to determine and graph the pdf of the magnitude squared of each of the expected QAM signals, e.g., as shown in FIG. 2 for 16- and 32-ary QAM signals. From such pdf graphs for the various expected QAM signals, the appropriate bin widths and bin positions that will facilitate optimum constellation size detection can be selected. For example, in the case of the 16/32 QAM apparatus discussed above, my technique utilized two histogram bins positioned near specific pdf peaks. In that particular case, where two constellation sizes are to be discriminated, my technique need only use two bins. Consequently, a 32/64 QAM apparatus might use the same configuration as the previously described 16/32 QAM apparatus with the bin locations adjusted slightly to optimize performance for the constellations under consideration. However, in general, for expanded use of my technique, M histogram bins are necessary to discriminate between M constellation sizes.

Considering apparatus which discriminates between constellation sizes of 16, 32 and 64-ary QAM signals, such apparatus uses three histogram bins. Two bins are identical to those in the 16/32 QAM apparatus and the third bin, i.e., two comparators and an associated counter, is positioned near the normalized power of 1.2. This is the location of a 64-ary QAM constellation point with a relatively high probability of occurrence, e.g., 3/16th. The ultimate decision as to which constellation size is present is based on the relative symbol accumulations in each of the three bins. The widths of the histogram bins and the integration time are adjusted to achieve the desired probability of error for the apparatus.

On the other hand, when one of M constellation sizes is to be detected where M is greater than three, a more sophisticated apparatus than that of the 16/32 QAM apparatus is typically needed. As a general rule, if the apparatus must discriminate between M constellation sizes, the apparatus must be capable of measuring at least $M-1$ degrees of freedom within the QAM signal. This is accomplished by using the absolute accumulations (symbol counts) in each of the histogram bins rather than the relative accumulations as accomplished by the 16/32 QAM apparatus. As such, the absolute accumulations in each bin are compared to expected accumulation values that should result at the end of the integration period. This absolute accumulation to expected accumulation comparison is accomplished in conjunction with the relative accumulation comparison as discussed previously. As such, the appropriate number of degrees of freedom can be met without using an excessive number of bins.

Alternatively, the degrees of freedom can be met by using more than two histogram bins and analyzing absolute accumulation in each bin. At the expense of more implementation hardware, several histogram bins are utilized to count symbols and the resulting count in each bin is matched against templates of expected count values corresponding to a pdf for each of the M expected QAM constellation sizes. The best match results in a constellation size being selected as the constellation size of the received QAM signal.

Although one embodiment which incorporates the teachings of the present invention has been shown and described in detail herein, those skilled in the art can readily devise many other varied embodiments that still incorporate these teachings.

I claim:

1. In a communications receiver capable of receiving a quadrature amplitude modulated (QAM) signal, wherein said QAM signal contains one of a plurality of constellation sizes, apparatus for determining the constellation size of the QAM signal comprising:

means for squaring a magnitude of said QAM signal and for producing a magnitude squared QAM signal;

means, connected to said squaring means, for analyzing a probability density function of said QAM signal by examining the magnitude squared QAM signal to determine the constellation size of the QAM signal being received;

means, responsive to said QAM signal and connected to said analyzing means, for establishing a duration during which said analyzing means analyzes said QAM signal; and means, connected to said analyzing means and said duration establishing means, for producing a signal indicative of the constellation size of said QAM signal being received.

2. The apparatus of claim 1, wherein said analyzing means further comprises:

means for accumulating symbols of said magnitude squared QAM signal during said duration.

3. The apparatus of claim 2 wherein said accumulating means further comprises a plurality of bins each having a position and width such that each bin is positioned to accumulate symbols occurring near at least one peak in said probability density function.

4. The apparatus of claim 3 wherein said bin width for each of said bins is established by corresponding first and second comparators, wherein said magnitude squared QAM signal forms an input to a positive terminal of said first comparator and an upper threshold signal forms an input to a negative terminal of said first comparator, and wherein said magnitude squared QAM signal forms an input to a negative terminal of said second comparator and a lower threshold signal forms an input to a positive terminal of said second comparator, wherein a difference in magnitudes between said upper and lower threshold signals establishes said bin width, said upper and lower thresholds being predefined so as to define said each bin having said bin width and being electrically centered about said one peak in the probability density function of said QAM signal.

5. The apparatus of claim 4 wherein said accumulating means further comprises, for each of said bins, a counter, connected to said first and second comparators in said each bin, a content of said counter is incremented by one whenever said magnitude squared QAM signal exceeds said lower threshold signal and does not exceed said upper threshold signal such that said accumulating means has a plurality of counters, whereby said count held in lid each of said counters indicates a number of said symbols having a power level that occurs within the bin width for a corresponding one of a plurality of bins.

6. The apparatus of claim 5 wherein said analyzing means further comprises means, connected to each of said counters, for comparing, to one another, the count held by said each counter during said duration so as to provide a comparison and wherein said producing means, in response to said comparison, produces a signal indicative of the constellation size of said QAM signal being received.

7. The apparatus of claim 6 wherein said QAM signal is either a 16-ary or 32-ary QAM signal and wherein said accumulating means contains two bins having a counter connected to each bin so as to form two counters within said analyzing means.

8. The apparatus of claim 7 wherein said comparing means determines which one of the two counters has a larger count than the other one of the two counters at an end of the duration, and wherein said producing means produces a signal indicative of which counter has the larger count.

9. The apparatus of claim 6 wherein said QAM signal is either a 16-ary, 32-ary or 64-ary QAM signal and wherein said accumulating means contains three bins having a counter connected to each bin so as to form three counters within said analyzing means.

10. The apparatus of claim 9 wherein said comparing means determines which of the three counters has a largest count than the other two of the three counters at an end of the duration, and wherein said producing means produces a signal indicative of which counter has the largest count.

11. The apparatus of claim 5 wherein said analyzing means further comprises means, connected to each of said counters, for comparing said count held by each of said counters during said duration to an expected count value so as to provide count comparisons and wherein said producing means, in response to said count comparisons, produces a signal indicative of the constellation size of said QAM signal being received.

12. The apparatus of claim 11 wherein said comparing means further comprises means, connected to each of said counters, for comparing, to one another, the count held by said each counter during said duration.

13. In a communications receiver capable of receiving a quadrature amplitude modulated (QAM) signal, wherein said QAM signal contains one of a plurality of constellation sizes, a method for determining the constellation size of the QAM signal comprising the steps of:
receiving a QAM signal having a constellation size;
squaring a magnitude of said QAM signal to produce a magnitude squared QAM signal;
analyzing a probability density function of said QAM signal by examining the magnitude squared QAM signal to determine the constellation size of the QAM signal being received;
establishing, in response to the received QAM signal, a duration during which said analyzing step is accomplished; and
producing a signal indicative of the constellation size of the QAM signal being received.

14. The method of claim 13 wherein said analyzing step further comprises the step of accumulating symbols of said magnitude squared QAM signal during said established duration.

15. The method of claim 14 wherein said accumulating step further comprises the steps of establishing a plurality of bins each having a position and width such that each of said bins is positioned to accumulate symbols occurring near at least one peak in said probability density function.

16. The method of claim 15 wherein said accumulating step further comprises the step of establishing each of said bins by comparing said magnitude squared QAM signal to corresponding upper and lower threshold signals, wherein a difference in magnitudes of said upper and lower threshold signals establishes the bin width, said upper and lower threshold signals being predefined so as to define said each bin having said bin width and being electrically centered about said one peak in the probability density function of said QAM signal.

17. The method of claim 16 wherein said accumulating step further comprises the step of separately counting a number of symbols of said magnitude squared QAM signal that occur within each of said bins during the duration.

18. The method of claim 17 wherein said analyzing step further comprises the steps of comparing to one another the number of symbols counted for each bin during the duration and producing, in response to said number comparing step, a signal indicative of the constellation size of the QAM signal being received.

19. The method of claim 18 wherein said QAM signal is either a 16-ary or 32-ary QAM signal and wherein said accumulating step establishes two bins.

20. The method of claim 19 wherein said comparing step further comprises the steps of counting, during the duration, the number of symbols that occur in each of the two bins; determining, at an end of the duration, which one of the two bins has a larger number of symbols occurring therein relative to the other one of the two bins; and producing, in response to the one bin holding the larger number of symbols, a signal indicative of which type of QAM signal is being received.

21. The method of claim 18 wherein said QAM signal is either a 16-ary, 32-ary or 64-ary QAM signal and wherein said accumulating step establishes three bins.

22. The method of claim 21 wherein said comparing step further comprises the steps of counting, during the duration, the number of symbols that occur in each of the three bins; determining, at an end of the duration, which one of the three bins has a largest number of symbols occurring therein relative to the other two of the three bins; and producing, in response to the bin holding the largest number of symbols, a signal indicative of which type of QAM signal is being received.

23. The method of claim 17 wherein said analyzing step further comprises the steps of comparing the number of symbols counted in said each bin during the duration to an expected corresponding count value for said each bin and producing, in response to said comparison, a signal indicative of the constellation size of the QAM signal being received.

24. The method of claim 23 wherein said comparing step further comprises the step of comparing, to one another, the number of symbols counted in each bin during the duration.

* * * * *